United States Patent Office 2,883,407
Patented Apr. 21, 1959

2,883,407

ORGANO MERCURIC MERCAPTIDES

Albert L. Flenner, Wilmington, Del., assignor to E. I. du Pont de Nemours and Company, Wilmington, Del., a corporation of Delaware No Drawing. Application April 1, 1955
Serial No. 498,754

4 Claims. (Cl. 260—431)

This invention relates to lower aliphatic mercury salts of hydroxy monomercaptans, and their use as fungicides, especially as seed disinfectants.

The lower aliphatic mercury salts of hydroxy monomercaptans of my invention are represented by the formula $$R'-Hg-S-R$$

where R is a hydroxylated organic radical having at least 2 carbon atoms and R' is a lower aliphatic radical.

The term "lower" as used herein to describe aliphatic radicals is used in the customary sense, that is, as including radicals containing not more than 6 carbon atoms. Accordingly, R' of the formula contains a maximum of 6 carbon atoms.

The lower aliphatic group, that is, R' can be either unsubstituted or substituted with any of a wide variety of substituents.

It can be a monovalent lower aliphatic radical, such as a lower alkyl, which can be widely substituted. For example, R' as a lower alkyl can be methyl, ethyl, propyl, butyl, hexyl, methoxyethyl, methoxymethyl, nitromethyl, hydroxybutyl, cyanohexyl, chloroethyl, bromoethyl, sulfopropyl or methoxypropyl.

The hydroxylated group, that is R of the above formula, can be either a hydroxylated monovalent aliphatic radical containing at least 2 carbon atoms such as a hydroxyalkyl or a hydroxyalkenyl, or it can be a hydroxylated monovalent cycloaliphatic radical, any of which can be substituted with various substituents as well as being substituted with one or more hydroxy groups.

Where R is a hydroxyalkyl, it can be a lower hydroxyalkyl containing at least 2 carbon atoms, such as hydroxyethyl, hydroxypropyl, hyproxybutyl, hydroxypentyl, hydroxyhexyl, hydroxynitromethyl, hydroxycyanobutyl, hydroxyfluorohexyl, hydroxychloroethyl, or 3-ethoxy-2-hydroxypropyl. Likewise, R can be a higher hydroxyalkyl such as octyl, decyl, pentadecyl, eicosyl, or hexacosyl hydroxylated in one or more positions and substituted in one or more positions with groups such as nitro, cyano, chloro, fluoro, methoxy or ethoxy. Where R is a hydroxylated alkenyl, it can be, for example, 4-hydroxy-2-butenyl, 4-hydroxy-3-methyl-2-butenyl or 4-hydroxy-3-(hydroxymethyl)-2-butenyl. Also, it may be a hydroxylated alkenyl substituted in one or more positions such as with the substituents listed above.

Likewise, R can be a hydroxylated monovalent cycloaliphatic group such as cyclobutyl, cyclopentyl, cyclohexyl or indanyl hydroxylated in one or more positions and either unsubstituted or substituted in one or more positions with groups such as those set forth above.

While the lower aliphatic mercury salts of long chain hydroxy monomercaptans, such as the salts of hydroxyhexacosyl mercaptan, can be used satisfactorily in fungicidal compositions, it is usually desirable to use lower aliphatic mercury salts of monomercaptans containing from 2 through 18 carbon atoms because of cost and availability considerations. The compounds of this class are represented by the formula $$R'HgSR$$

where R' is a monovalent lower aliphatic group as described above and R is a hydroxylated monovalent aliphatic or hydroxylated monovalent cycloaliphatic radical of 2 to 18 carbon atoms.

The compounds of the above formula are in most instances solids that are readily soluble in water, alcohols, polar solvents or the like.

Illustrative of the compounds represented by the above formula are the following:

1. Ethylmercury 9,10-dihydroxyoctadecyl mercaptide
2. Isopropylmercury 4-hydroxycyclohexyl mercaptide
3. Methylmercury 1,3,5,7 - tetramethyl - 2 - hydroxyoctyl mercaptide
4. Ethylmercury hexahydro - 5,6 - dihydroxy - 4,7-methanoindan-1-ylmethyl mercaptide
5. Methoxyethylmercury 2,3,4-trihydroxyhexyl mercaptide
6. Ethylmercury 2-hydroxy-3-ethoxypropyl mercaptide
7. 3 - methoxypropylmercury 2 - hydroxyisopropyl mercaptide
8. 5-cyanopentylmercury 2,4-dihydroxyhexyl mercaptide Of those compounds represented by the above formula, the better compounds are those where R' is a lower alkyl group and R is a hydroxyalkyl group of 2 through 18 carbon atoms. In other words, the better compounds are the lower alkyl mercury salts of hydroxyalkyl monomercaptans that contain 2-18 carbon atoms. Illustrative of these better compounds are the following:

9. Methylmercury 2-hydroxyethyl mercaptide
10. Tert. butylmercury gluco-2,3,4,5,6-pentahydroxyhexyl mercaptide
11. Ethylmercury 2,3,4,5,6-pentahydroxyhexyl mercaptide
12. Methoxymethylmercury 2,4,6 - trihydroxy - 3,5-methoxyhexyl mercaptide
13. Propylmercury 2-hydroxy-3-chloropentyl mercaptide
14. 2,3 - dihydroxypropylmercury 9,10 - dihydroxydecyl mercaptide Of the compounds where R' is a lower alkyl and R is a hydroxyalkyl, the more satisfactory results have been obtained using compounds where R is a lower hydroxyalkyl of at least 2 carbon atoms. Some typical examples of these lower alkyl mercury salts of hydroxylated lower alkyl monomercaptans are as follows:

15. Ethylmercury 2,3,4,5 - tetrahydroxy - 1 - (hydroxymethyl)pentyl mercaptide
16. Isopropylmercury 2,5-dihydroxypentyl mercaptide
17. Methylmercury 3,4,5-trihydroxyhexyl mercaptide
18. Butylmercury 6-hydroxyhexyl mercaptide Of all the above-described compounds, by far the most preferred from the standpoint of ease and cost of preparation and effectiveness in fungicidal formulations are the lower alkyl salts of hydroxylated lower alkyl monomercaptans of 2-6 carbon atoms where each carbon atom of the alkyl mercaptans except the carbon onto which is attached the mercaptan (—SH) group is substituted with one hydroxy group.

These preferred compounds are made from reactants that are in general readily prepared, relatively inexpensive, and in some instances commercially available. They are in most cases solids that are readily soluble in water and a great variety of organic solvents. For these reasons they are ideally suited for inclusion in fungicidal compositions.

The following are set forth as typifying the preferred compounds of the invention:

19. Ethylmercury 2,2'-dihydroxyisopropyl mercaptide
20. Ethylmercury 2,3-dihydroxypropyl mercaptide
21. Ethylmercury 2,3,4,5-tetrahydroxyphenyl mercaptide
22. Propylmercury 2,3,4,5-tetrahydroxypentyl mercaptide
23. Methylmercury 2,3-dihydroxypropyl mercaptide
24. Methylmercury 2,2'-dihydroxyisopropyl mercaptide
25. Tert. butylmercury 2,3-dihydroxypropyl mercaptide
26. Ethylmercury 2,3,4-trihydroxy-1-(hydroxymethyl)-butyl mercaptide
27. Ethylmercury 2,3,4,5 - tetrahydroxy - 1 - (hydroxymethyl)pentyl mercaptide
28. Ethylmercury gluco-2,3,4,5,6-pentahydroxyhexyl mercaptide
29. Propylmercury 2,3,4,5,6-pentahydroxyhexyl mercaptide
30. Methylmercury 2,3,4,5,6-pentahydroxyhexyl mercaptide
31. Methoxyethylmercury 2,3,4,5,6-pentahydroxyhexyl mercaptide My aliphatic mercury salts of hydroxy monomercaptans are readily made by reacting a lower aliphatic mercury salt or hydroxide with a hydroxy monomercaptan, that is a hydroxy mercaptan containing only a single mercapto group. The following equation illustrates the reaction:

$$R'HgX + RSH \rightarrow R'HgSR + HX$$

where R and R' are the desired organic radicals as defined above, and X is hydroxy or an acid radical, such as acetate or phosphate.

In general, the fungicidal compositions of the invention contain in sufficient amount to exert fungicidal action an aliphatic mercury salt of a hydroxy monomercaptan in admixture with an adjuvant of the type customarily included in fungicidal compositions, such as organic solvents, sticker solvents, wetting agents and/or dyes. The preferred compositions also contain ethylmercury acetate or ethylmercury hydroxide with or without acetic acid.

These preferred compositions can be prepared by adding an aliphatic mercury salt of a hydroxy monomercaptan to water and/or alcohol solutions of ethylmercury acetate or ethylmercury hydroxide.

Alternatively, the preferred compositions can be obtained by adding the hydroxymercaptan reactant to solutions containing an excess of ethylmercury acetate or hydroxide. The hydroxymercaptan reactant combines with ethylmercury reactant on a mol for mol basis to form the ethylmercury salt of the particular hydroxymercaptan employed.

The resultant composition contains the excess unreacted ethylmercury reactant as well as ethylmercury hydroxymercaptide. Where ethylmercury acetate is employed, the composition also contains the acetic acid that is formed as a product of the hydroxymercaptan-ethylmercury acetate reaction.

Where the composition is to be used for seed treatment in some cases it has been found desirable to include a sticker solvent of low volatility such as glycols, heavy mineral or vegetable oils, or fish oils. Obviously the solvent should be substantially non-phytotoxic in nature. The function of the sticker solvent is to facilitate distribution and retention of the fungicide.

The inclusion of a dye is especially useful in compositions to be used in the treatment of seeds since it provides a means for marking clearly those seeds that have been treated. Dyes such as the water soluble rhodamine dyes can, for example, be included. Also the water and alcohol soluble chrysoidine and methyl violet dyes can be used.

The fungicidal composition can also contain small amounts of a base such as ammonia, amines or sodium hydroxide.

The invention is further illustrated by the following examples in addition to the examples above:

*Example 1*

A solution containing 24.67 grams of ethylmercury hydroxide in 200 ml. of methanol is prepared. To this solution is added 10.8 grams of thioglycerol. The mixture is agitated vigorously for about ten minutes, during which period there is a noticeable rise in temperature although the reaction is not excessively vigorous.

The ethylmercury thioglycerol produced from these reactants is then isolated by evaporation of the solvent. There is thus obtained 33.6 grams of a sirupy liquid that slowly crystallizes on standing to give a white crystalline solid. This compound has a melting point of 50 to 53° C. and is readily soluble in water and alcohol.

*Analysis.*—Calculated for $C_5H_{12}SHg$: C, 17.80; H, 3.59; S, 9.52; Hg, 59.60. Found: C, 18.41; H, 3.72; S, 9.42; Hg, 59.19.

A part of this ethylmercury salt of 2,3-dihydroxypropyl mercaptide (ethylmercury thioglycerol) is then formulated into a fungicidal composition of the following ingredients:

| | Percent |
|---|---|
| Ethylmercury 2,3-dihydroxypropyl mercaptide | 4.0 |
| Water | 45.0 |
| Ethanol | 20.0 |
| Ethylene glycol | 30.0 |
| Rhodamine dye | 1.0 |

This solution, when sprayed upon wheat seed at a dosage of ¾ oz. of solution per bushel of seed, is highly effective in controlling fungus growth in the seed.

Another part of the ethylmercury thioglycerol is made into a 10% solution by dissolving 10 parts by weight in 45 parts by weight of ethanol and 45 parts by weight of water. The resulting solution when added to wet paper pulp at the rate of ¼ pound per ton of pulp is highly effective in controlling slime producing organisms.

*Example 2*

The methylmercury salt of 2,3-dihydroxypropyl mercaptan is prepared in accordance with the procedure set forth in Example 1 but using a molar equivalent amount of methylmercury hydroxide in place of the ethylmercury hydroxide employed in Example 1. The resultant compound is an off-white crystalline solid that is readily soluble in water and alcohol.

This compound, when substituted for the active ingredient in the formulations of Example 1, gives a fungicidal composition that is highly effective for slime control and to control fungus growth on wheat seed.

*Example 3*

The propylmercury salt of 2,3-dihydroxypropyl mercaptan is prepared in accordance with the procedure set forth in Example 1 but using a molar equivalent amount of propylmercury hydroxide in place of the ethylmercury hydroxide employed in Example 1. The resultant compound is an off-white crystalline solid that is soluble in water and alcohol.

The propylmercury salt of 2,3-dihydroxypropyl mercaptan is then formulated into a fungicidal composition of the following ingredients:

| | Percent |
|---|---|
| Propylmercury 2,3-dihydroxypropyl mercaptide | 4.0 |
| Water | 46.9 |
| Ethylene glycol | 48.0 |
| Rhodamine dye | 1.0 |
| (Wetting agent) | 0.1 |

This fungicidal composition when sprayed upon wheat seed at a dosage of ¾ oz. of solution per bushel of seed is highly effective in controlling fungus growth on the seed.

Example 4

The butylmercury salt of 2,3-dihydroxypropyl mercaptan is prepared in accordance with the procedure set forth in Example 1 but using a molar equivalent amount of butylmercury hydroxide in place of the ethylmercury hydroxide employed in Example 1. The resultant compound is a solid that is soluble in water and alcohol.

The butylmercury salt of 2,3-dihydroxypropyl mercaptan is then formulated into a fungicidal composition of the following ingredients:

| | Percent |
|---|---|
| Butylmercury 2,3-hydroxypropyl mercaptide | 1.0 |
| Ethanol | 68.0 |
| Ethylene glycol | 30.0 |
| Rhodamine dye | 1.0 |

This fungicidal composition when sprayed upon wheat seed at a dosage of 3 oz. per bushel is highly effective in controlling fungus growth on the seed.

Example 5

The pentylmercury salt of 2,3-dihydroxypropyl mercaptan is prepared in accordance with the procedure set forth in Example 1 but using a molar equivalent amount of pentylmercury hydroxide in place of the ethylmercury hydroxide employed in Example 1. The resultant compound is readily soluble in alcohol.

The pentylmercury salt of 2,3-dihydroxypropyl mercaptan is then formulated into a fungicidal composition by substituting it for the fungicidally active ingredient of the formulation of Example 4.

This fungicidal composition when sprayed upon wheat seed at a dosage of 3 oz. per bushel is highly effective in controlling fungus growth on the seed.

Example 6

The hexylmercury salt of 2,3-dihydroxypropyl mercaptan is prepared in accordance with the procedure set forth in Example 1 but using a molar equivalent amount of hexylmercury hydroxide in place of the ethylmercury hydroxide employed in Example 1. This compound is a white crystalline solid that is readily soluble in alcohol.

The hexylmercury salt of 2,3-dihydroxypropyl mercaptan is then formulated into a fungicidal composition by substituting it for the fungicidally active ingredient of the formulation of Example 4.

This fungicidal composition when sprayed upon wheat seed at a dosage of 3 oz. per bushel is highly effective in controlling fungus growth on the seed.

Example 7

Ethylmercury 2,2′-dihydroxyisopropyl mercaptide is prepared in accordance with the procedure set forth in Example 1 but using molar equivalent amounts of 2,2′-dihydroxyisopropyl mercaptan in place of the thioglycerol of Example 1. This compound is a white crystalline solid that is readily soluble in water and alcohol.

The ethylmercury salt of 2,2′-dihydroxyisopropyl mercaptide is then formulated into a fungicidal composition by substituting it for the fungicidally active ingredient of the formulation of Example 1.

This fungicidal composition when sprayed upon wheat seed at a dosage of ¾ oz. per bushel is highly effective in controlling fungus growth on the seed.

Example 8

Ethylmercury 9,10-dihydroxyoctadecyl mercaptan is prepared in accordance with the procedure set forth in Example 1 but using molar equivalent amounts of 9,10-dihydroxyoctadecyl mercaptan in place of the thioglycerol of Example 1.

The ethylmercury salt of 9,10-dihydroxyoctadecyl mercaptan is then formulated into a fungicidal composition of the following ingredients:

| | Percent |
|---|---|
| Ethylmercury 9,10-dihydroxyoctadecyl mercaptide | 2.0 |
| Isopropanol | 98.0 |

This fungicidal composition when sprayed upon wheat seed is highly effective in preventing fungus growth on the seed.

Example 9

Ethylmercury gluco 2,3,4,5,6-pentahydroxyhexyl mercaptide (thiosorbitol) is prepared in accordance with the procedure set forth in Example 1 but using moler equivalent amounts of gluco 2,3,4,5,6-pentahydroxyhexyl mercaptide in place of the thioglycerol of Example 1.

This compound is a white crystalline solid that is readily soluble in water and alcohol. It has a melting point of 97 to 100° C.

*Analysis.*—Calculated for $C_6H_{13}SHg$: C, 22.45; H, 4.25; S, 7.50; Hg, 46.90. Found: C, 22.13; H, 4.21; S, 6.91; Hg, 47.76.

The ethylmercury salt of gluco 2,3,4,5,6-pentahydroxyhexyl mercaptide is then formulated into a fungicidal composition of the following ingredients:

| | Percent |
|---|---|
| Ethylmercury gluco 2,3,4,5,6 - pentahydroxyhexyl mercaptide | 4.0 |
| Water | 47.5 |
| Ethanol | 47.5 |
| Rhodamine dye | 1.0 |

This fungicidal composition when sprayed upon wheat seed at a dosage of ¾ oz. per bushel is highly effective in preventing fungus growth on the seed. This composition is also highly effective in controlling fungus growth on flax and sorghum seed.

Example 10

Ethylmercury 4-hydroxycyclohexyl mercaptide is prepared in accordance with the procedure set forth in Example 1 but using molar equivalent amounts of 4-hydroxycyclohexyl mercaptide in place of the thioglycerol of Example 1.

The ethylmercury 4-hydroxycyclohexyl mercaptide is then formulated into a fungicidal composition of the following ingredients:

| | Percent |
|---|---|
| Ethylmercury 4-hydroxycyclo-hexyl mercaptide | 4.0 |
| Isopropanol | 95.0 |
| Rhodamine dye | 1.0 |

This fungicidal composition when sprayed upon wheat seed is highly effective in controlling fungus growth on the seed.

Example 11

Ethylmercury 1,3,5,7-tetramethyl-2-hydroxyoctyl mercaptide is prepared in accordance with the procedure set forth in Example 1 but using molar equivalent amounts of 1,3,5,7-tetramethyl-2-hydroxyoctyl mercaptide in place of the thioglycerol of Example 1.

The ethylmercury 1,3,5,7-tetramethyl-2-hydroxyoctyl mercaptide is then formulated into a fungicidal composition of the following ingredients:

| | Percent |
|---|---|
| Ethylmercury 1,3,5,7 - tetramethyl - 2 - hydroxyoctyl mercaptide | 2.0 |
| Cyclohexanone | 97.0 |
| Rhodamine dye | 1.0 |

This fungicidal composition when sprayed upon wheat seed is highly effective in preventing fungus growth on the seed.

Example 12

Ethylmercury 6-hydroxyhexyl mercaptide is prepared in accordance with the procedure set forth in Example 1 but using molar equivalent amounts of 6-hydroxyhexyl mercaptide in place of the thioglycerol of Example 1.

The ethylmercury 6-hydroxyhexyl mercaptide is then formulated into a fungicidal composition by substituting it for the fungicidally active ingredient of the formulation of Example 11.

This fungicidal composition when sprayed upon wheat seed is highly effective in preventing fungus growth on the seed.

Similarly, by reacting the lower aliphatic mercury hydroxides of Examples 1 thru 6 with the hydroxy monomercaptans of Examples 7 thru 12, the corresponding organo mercury mercaptides are prepared.

Example 13

The 2-hydroxyethylmercury salt of 2,3-dihydroxypropyl mercaptan is prepared in accordance with the procedure set forth in Example 1 but using a molar equivalent amount of 2-hydroxyethylmercury hydroxide in place of the ethylmercury hydroxide employed in Example 1. The resultant compound is an off-white crystalline solid that is readily soluble in water and alcohol.

The 2-hydroxyethylmercury salt of 2,3-dihydroxypropyl mercaptan is then formulated into a fungicidal composition by substituting it for the fungicidally active ingredient of the formulation of Example 1.

This fungicidal composition when sprayed upon wheat seed at a dosage of ¾ oz. of solution per bushel of seed is highly effective in controlling fungus growth on the seed.

Example 14

The 2-methoxyethylmercury salt of 2,3-dihydroxypropyl mercaptan is prepared in accordance with the procedure set forth in Example 1 but using a molar equivalent amount of 2-methoxyethylmercury hydroxide in place of the ethylmercury hydroxide employed in Example 1. The resultant compound is an off-white crystalline solid that is readily soluble in water and alcohol.

The 2-methoxyethylmercury salt of 2,3-dihydroxypropyl mercaptan is then formulated into a fungicidal composition by substituting it for the fungicidally active ingredient of the formulation of Example 1.

This fungicidal composition when sprayed upon wheat seed at a dosage of ¾ oz. of solution per bushel of seed is highly effective in controlling fungus growth on the seed.

Example 15

Ethylmercury 2-hydroxy-2'-cyanoisopropyl mercaptide is prepared in accordance with the procedure set forth in Example 1 but using molar equivalent amounts of 2-hydroxy-2'-cyanoisopropyl mercaptan in place of the thioglycerol of Example 1. This compound is soluble in alcohol.

The ethylmercury 2-hydroxy-2'-cyanoisopropyl mercaptide is then formulated into a fungicidal composition by substituting it for the fungicidally active ingredient of the formulation of Example 4.

This fungicidal composition when sprayed upon wheat seed at a dosage of ¾ oz. per bushel is highly effective in controlling fungus growth on the seed.

Example 16

Ethylmercury 2-hydroxy-3-ethoxypropyl mercaptide is prepared in accordance with the procedure set forth in Example 1 but using molar equivalent amounts of 2-hydroxy-3-ethoxypropyl mercaptide in place of the thioglycerol of Example 1. This compound is soluble in alcohol.

The ethylmercury 2-hydroxy-3-ethoxypropyl mercaptide is then formulated into a fungicidal composition by substituting it for the fungicidally active ingredient of the formulation of Example 4.

This fungicidal composition when sprayed upon wheat seed at a dosage of ¾ oz. per bushel is highly effective in controlling fungus growth on the seed.

Example 17

Ethylmercury 3,5,7 - trimethoxy - 2 - hydroxyoctyl mercaptide is prepared in accordance with the procedure set forth in Example 1 but using molar equivalent amounts of 3,5,7-trimethoxy-2-hydroxyoctyl mercaptide in place of the thioglycerol of Example 1. This compound is soluble in ketones.

The ethylmercury 3,5,7-trimethoxy-2-hydroxyoctyl mercaptide is then formulated into a fungicidal composition by substituting it for the fungicidally active ingredient of the formulation of Example 11.

This fungicidal composition when sprayed upon wheat seed is highly effective in controlling fungus growth on the seed.

Example 18

A solution containing 3.4 parts by weight of ethylmercury acetate, 47.79 parts of water and 47.79 parts of ethanol is prepared. To this solution is added 1.02 parts by weight of thioglycerol. The mixture is agitated vigorously for about 10 minutes during which time there is a noticeable rise in temperature although the reaction is not excessively vigorous. After reaction the solution comprises ethylmercury thioglycerol, ethylmercury acetate and acetic acid.

The thusly prepared solution is then applied to wheat, flax and sorghum seed. Dosages of ¾ oz. of solution per bushel of seed are employed in the case of wheat and sorghum, and 2½ oz. of solution per bushel for flax seed. The seeds are then planted and, after allowing sufficient time for the seeds to germinate and the plants to emerge from the soil, stand counts are made.

The treated wheat seed gives a stand count of 1.7 times that of untreated wheat seed. The treated flax seed gives a stand count of 6.3 times that of untreated flax seed. Likewise the treated sorghum seed gives a stand count of 3.3 times that of untreated sorghum seed.

Example 19

A solution is prepared containing 3.40 parts by weight of ethylmercury acetate, 20.0 parts by weight of ethanol, 30.0 parts by weight of ethylene glycol and 44.58 parts by weight of water. To this solution is added 1.02 parts by weight of thioglycerol. The mixture is agitated vigorously for about ten minutes, during which period there is a noticeable rise in temperature although the reaction is not excessively vigorous. After reaction the solution comprises ethylmercury 2,3-dihydroxypropyl mercaptide (ethylmercury thioglycerol), ethylmercury acetate and acetic acid. To this solution is added 1.0 part by weight of rhodamine dye.

The resultant composition when applied to sorghum seed at a dosage of ¾ oz. per bushel of seed is highly effective in controlling fungus growth on the seed.

Example 20

A solution containing 9.2 parts by weight of ethylmercury acetate, 43.5 parts by weight of ethanol and 43.5 parts by weight of water is prepared. To this solution is added 2.8 parts by weight of thioglycerol. The mixture is agitated vigorously for about ten minutes during which period there is a noticeable rise in temperature although the reaction is not excessively vigorous. After reaction the solution comprises ethylmercury 2,3-dihydroxy-propyl mercaptide, ethylmercury acetate and acetic acid. To this solution is added 1 part by weight of rhodamine dye.

The resultant composition is applied to wheat seed at the rate of ¼ oz. per bushel by first diluting one pint of the composition with one gallon of water and then applying 4 oz. of this solution to one bushel of seed. The treated seed is thereby rendered highly resistant to attack the common fungus disease organisms.

Example 21

A solution is prepared containing 9.0 parts by weight of ethylmercury acetate, 43.05 parts by weight of ethanol and 43.00 parts by weight of water. To this solution is added 4.95 parts of thiosorbitol. After reaction the solution comprises ethylmercury gluco-2,3,4,5,6-pentahydroxyhexyl mercaptide, ethylmercury acetate and acetic acid.

The resultant solution is applied to wheat seed at the rate of ¼ oz. per bushel by first diluting one pint of the composition with one gallon of water and then applying 4 oz. of this dilution to one bushel of seed. The treated seed is thereby rendered highly resistant to attack by the common fungus disease organisms.

Similarly fungicidally effective solutions containing other aliphatic mercury salts such as allyl and tert. butylmercury salts of 2,3-dihydroxypropyl mercaptan are readily prepared in accordance with the procedure of Example 19 by using the appropriate aliphatic mercury acetates. Likewise, solutions of aliphatic mercury salts of other hydroxymercaptans are prepared by introducing appropriate hydroxymercaptans into water-alcohol solutions of the aliphatic mercury salts.

*Example 22*

A solution containing 2 parts by weight of ethylmercury acetate and 96.8 parts by weight of ethanol is prepared. To this solution is added 1.2 parts by weight of thiosorbitol, equivalent to 87% of the ethylmercury acetate, and the solution is stirred vigorously. After reaction, the solution comprises ethylmercury gluco-2,3,4,5,6-pentahydroxyhexyl mercaptide, ethylmercury acetate and acetic acid.

The resultant solution when applied to flax seed at a dosage of 3 oz. of solution per bushel of seed gives a 91% increase in stand over untreated seed.

*Example 23*

A solution containing 3.1 parts by weight of ethylmercury phosphate and 95.88 parts by weight of ethanol is prepared. To this solution is added 1.02 parts by weight of thioglycerol. The mixture is agitated vigorously for about ten minutes. After reaction the solution comprises ethylmercury thioglycerol, ethylmercury phosphate and phosphoric acid.

The reaction solution is highly effective in controlling fungus growth on flax seed when applied at a dosage of 2½ oz. of solution per bushel of seed.

Similarly, fungicidally effective solutions of the other compounds of the invention as set forth hereinabove are prepared in accordance with the procedure set forth in the above example by employing in place of the reactants of this example equivalent amounts of appropriate organo mercury phosphates and hydroxymercaptans.

*Example 24*

A solution containing 2.9 parts by weight of ethylmercury hydroxide and 96.08 parts by weight of ethanol is prepared. To this solution is added 1.02 parts by weight of thioglycerol. The mixture is agitated vigorously for about 10 minutes. After reaction the solution comprises ethylmercury thioglycerol and ethylmercury hydroxide.

This solution is highly effective in controlling fungus growth on wheat seed when applied at a dosage of ¾ oz. per bushel.

It is to be understood that my compounds are in no way limited in utility to those uses set forth in the example, but rather they can be applied generally for the protection of organic matter subject to fungus infestation. Thus they can be used, for example, for the protection of carbohydrates, proteins and hydrocarbon oils. More specifically, they can be used, for example, to treat living plants such as fruit-bearing trees. Also they can be used to treat organic fibers or fabrics and cellulosic materials such as leather and wood. Likewise, they can be used to treat paints, lubricating oils and oil-drilling muds to protect such materials from fungus attack. Also the compounds of the invention can be used for such purposes as slime-control in paper mills, water-cooling towers and the like. Furthermore, in more concentrated dosages certain of the organo mercury hydroxymercaptides of the invention surprisingly possess herbicidal properties, and therefore have some utility as herbicides and in herbicidal formulations for use in killing undesired plants.

This application is a continuation-in-part of my co-pending U.S. patent application Serial No. 409,771, filed February 11, 1954, now abandoned.

I claim:

1. A compound represented by the formula

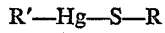

where R contains from 2 to 18 carbon atoms and is selected from the group consisting of hydroxylated monovalent aliphatic radicals and hydroxylated monovalent cycloaliphatic radicals, and R' is an alkyl radical containing less than 7 carbon atoms.

2. Ethylmercury 2,3-dihydroxypropyl mercaptide.

3. Ethylmercury gluco 2,3,4,5,6-pentahydroxyhexyl mercaptide.

4. Methylmercury 2,3-dihydroxypropyl mercaptide.

References Cited in the file of this patent

UNITED STATES PATENTS

| | | |
|---|---|---|
| 1,589,599 | Kharasch | June 22, 1926 |
| 1,862,896 | Kharasch | June 14, 1932 |
| 2,305,545 | Migrdichian | Dec. 15, 1942 |
| 2,471,621 | Hartmann et al. | May 31, 1949 |
| 2,614,960 | Somerville | Oct. 21, 1952 |
| 2,618,645 | Bowles | Nov. 18, 1952 |
| 2,636,045 | Halpern | Apr. 21, 1953 |

UNITED STATES PATENT OFFICE
CERTIFICATE OF CORRECTION

Patent No. 2,883,407                                        April 21, 1959

Albert L. Flenner

It is hereby certified that error appears in the printed specification of the above numbered patent requiring correction and that the said Letters Patent should read as corrected below.

Column 1, lines 37 and 38, for "bromoethyl" read -- bromomethyl --; column 3, line 5, for "2,3,4,5-tetrahydroxyphenyl" read -- 2,3,4,5-tetrahydroxypentyl --; column 5, line 12, for "2,3-hydroxypropyl" read -- 2,3-dihydroxypropyl --; column 8, line 69, for "solution" read -- dilution --; line 70, after the word "attack" insert -- by --.

Signed and sealed this 15th day of September 1959.

(SEAL)
Attest:

KARL H. AXLINE
Attesting Officer

ROBERT C. WATSON
Commissioner of Patents